United States Patent
Klein et al.

(10) Patent No.: US 10,931,931 B2
(45) Date of Patent: Feb. 23, 2021

(54) APPARATUS, SYSTEM, AND METHOD FOR GENERATING AN IMAGE

(71) Applicant: The Boeing Company, Chicago, IL (US)

(72) Inventors: Robert J. Klein, Ballwin, MO (US); John H. Aughey, Saint Louis, MO (US); Zachary L. Langford, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 15/820,086

(22) Filed: Nov. 21, 2017

(65) Prior Publication Data

US 2019/0158805 A1    May 23, 2019

(51) Int. Cl.
| | |
|---|---|
| H04N 13/204 | (2018.01) |
| H04N 5/225 | (2006.01) |
| G06K 9/00 | (2006.01) |
| G01J 3/28 | (2006.01) |
| G06T 5/50 | (2006.01) |
| H04N 13/275 | (2018.01) |

(52) U.S. Cl.
CPC .......... *H04N 13/204* (2018.05); *G01J 3/2823* (2013.01); *G06K 9/0063* (2013.01); *G06K 9/00201* (2013.01); *G06K 9/00671* (2013.01); *G06T 5/50* (2013.01); *H04N 5/2258* (2013.01); *H04N 13/275* (2018.05); *G06K 2009/00644* (2013.01); *G06K 2209/21* (2013.01); *G06T 2207/10036* (2013.01); *G06T 2207/10041* (2013.01)

(58) Field of Classification Search
CPC . H04N 13/204; H04N 13/275; G06K 9/00671
See application file for complete search history.

(56) References Cited

U.S. PATENT DOCUMENTS

| | | | |
|---|---|---|---|
| 2012/0183213 A1* | 7/2012 | Robles-Kelly | G06K 9/00362 382/165 |
| 2015/0109451 A1* | 4/2015 | Dhankhar | G01G 19/40 348/150 |
| 2017/0169620 A1* | 6/2017 | Bleiweiss | G06F 17/50 |
| 2017/0358119 A1* | 12/2017 | Forutanpour | G06T 11/001 |

OTHER PUBLICATIONS

Peng et al., Learning Deep Object Detectors from 3D Models, Computer Vision Foundation, pp. 1278-1286.

* cited by examiner

*Primary Examiner* — Girumsew Wendmagegn
(74) *Attorney, Agent, or Firm* — Kunzler Bean & Adamson (57) ABSTRACT

Described herein is a method of generating an image that includes receiving a set of data corresponding to an object. The method also includes generating a three-dimensional representation of the object using the set of data. The method includes generating properties for the object using the set of data. The method also includes associating the properties with the three-dimensional representation of the object, wherein the three-dimensional representation of the object and the properties for the object are used to produce training data for an object recognition algorithm.

20 Claims, 7 Drawing Sheets

FIG. 7

APPARATUS, SYSTEM, AND METHOD FOR GENERATING AN IMAGE

FIELD

This disclosure relates generally to object recognition, and more particularly to generating an image used in an object recognition training system.

BACKGROUND

Training data for object recognition systems can include limited object information. The object information may primarily be obtained from publically available images (e.g., photographs) of objects. Using such object information from public datasets limits the abilities of object recognition systems to identify objects outside of the training set and in different environmental conditions.

SUMMARY

The subject matter of the present application has been developed in response to the present state of the art, and in particular, in response to shortcomings of conventional image generation techniques. For example, conventional image generation techniques do not provide sufficient image properties to facilitate identifying an object by an object recognition system in a wide range of situations.

Accordingly, the subject matter of the present application has been developed to provide examples of an image generating apparatus, system, and method that overcome at least some of the above-discussed shortcomings of prior art techniques. More particularly, in some embodiments, described herein are apparatuses, systems, and methods for creating an image by generating an object having a three-dimensional representation and properties associated with the three-dimensional representation used for object recognition algorithms.

A method of generating an image includes receiving a set of data corresponding to an object. The method also includes generating a three-dimensional representation of the object using the set of data. The method includes generating properties for the object using the set of data. The method also includes associating the properties with the three-dimensional representation of the object, wherein the three-dimensional representation of the object and the properties for the object are used to produce training data for an object recognition algorithm. The preceding subject matter of this paragraph characterizes example 1 of the present disclosure.

The set of data includes a computer aided drawing model, a specification, sensor information, material composition information, or some combination thereof. The preceding subject matter of this paragraph characterizes example 2 of the present disclosure, wherein example 2 also includes the subject matter according to example 1, above.

The properties include information indicating how the object is viewed using one or more sensors. The preceding subject matter of this paragraph characterizes example 3 of the present disclosure, wherein example 3 also includes the subject matter according to any one of examples 1 or 2, above.

The one or more sensors include a panchromatic sensor, a multispectral sensor, a hyperspectral sensor, or some combination thereof. The preceding subject matter of this paragraph characterizes example 4 of the present disclosure, wherein example 4 also includes the subject matter according to example 3, above.

The properties include material composition information corresponding to the object. The preceding subject matter of this paragraph characterizes example 5 of the present disclosure, wherein example 5 also includes the subject matter according to any one of examples 1, 2, 3, or 4, above.

The properties include information indicating how the object is viewed from a plurality of distances. The preceding subject matter of this paragraph characterizes example 6 of the present disclosure, wherein example 6 also includes the subject matter according to any one of examples 1, 2, 3, 4, or 5, above.

The properties include a plurality of resolutions. The preceding subject matter of this paragraph characterizes example 7 of the present disclosure, wherein example 7 also includes the subject matter according to any one of examples 1, 2, 3, 4, 5, or 6, above.

An object recognition system includes a virtual training environment including a plurality of objects. The object recognition system also includes an object recognition algorithm configured to identify the plurality of objects, wherein at least one object of the plurality of objects is produced synthetically, the at least one object includes a three-dimensional representation and properties associated with the three-dimensional representation. The preceding subject matter of this paragraph characterizes example 8 of the present disclosure.

The object recognition algorithm is configured to label the plurality of objects. The preceding subject matter of this paragraph characterizes example 9 of the present disclosure, wherein example 9 also includes the subject matter according to example 8, above.

The object recognition algorithm is configured to identify the at least one object from a plurality of distances, a plurality of angles, a plurality of obliquities, a plurality of eye points, or some combination thereof. The preceding subject matter of this paragraph characterizes example 10 of the present disclosure, wherein example 10 also includes the subject matter according to any one of examples 8 or 9, above.

The object recognition algorithm is configured to identify the at least one object using a plurality of resolutions. The preceding subject matter of this paragraph characterizes example 11 of the present disclosure, wherein example 11 also includes the subject matter according to any one of examples 8, 9, or 10, above.

The object recognition algorithm is configured to identify the at least one object using a plurality of sensors. The preceding subject matter of this paragraph characterizes example 12 of the present disclosure, wherein example 12 also includes the subject matter according to any one of examples 8, 9, 10, or 11, above.

The plurality of sensors includes a panchromatic sensor, a multispectral sensor, a hyperspectral sensor, or some combination thereof. The preceding subject matter of this paragraph characterizes example 13 of the present disclosure, wherein example 13 also includes the subject matter according to example 12, above.

The properties include information indicating how the object is viewed using one or more sensors. The preceding subject matter of this paragraph characterizes example 14 of the present disclosure, wherein example 14 also includes the subject matter according to any one of examples 8, 9, 10, 11, 12, or 13, above.

The properties include material composition information corresponding to the object. The preceding subject matter of this paragraph characterizes example 15 of the present disclosure, wherein example 15 also includes the subject matter according to any one of examples 8, 9, 10, 11, 12, 13, or 14, above.

An apparatus includes a data processing module that analyzes data corresponding to an object. The apparatus also includes an object generation module that synthetically generates the object, wherein the object includes a three-dimensional representation and properties associated with the three-dimensional representation. At least one of the data processing module and the object generation module includes one or more of hardware and executable code, the executable code stored on one or more non-transitory computer readable storage media. The preceding subject matter of this paragraph characterizes example 16 of the present disclosure.

The data processing module receives the data corresponding to the object from a computer aided drawing model, a specification, sensor information, material composition information, or some combination thereof. The preceding subject matter of this paragraph characterizes example 17 of the present disclosure, wherein example 17 also includes the subject matter according to example 16, above.

The object generation module synthetically generates the object without a photograph of the object. The preceding subject matter of this paragraph characterizes example 18 of the present disclosure, wherein example 18 also includes the subject matter according to any one of examples 16 or 17, above.

The properties include spectral information, spatial information, or a combination thereof. The preceding subject matter of this paragraph characterizes example 19 of the present disclosure, wherein example 19 also includes the subject matter according to any one of examples 16, 17, or 18, above.

The properties include an environment corresponding to the object. The preceding subject matter of this paragraph characterizes example 20 of the present disclosure, wherein example 20 also includes the subject matter according to any one of examples 16, 17, 18, or 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
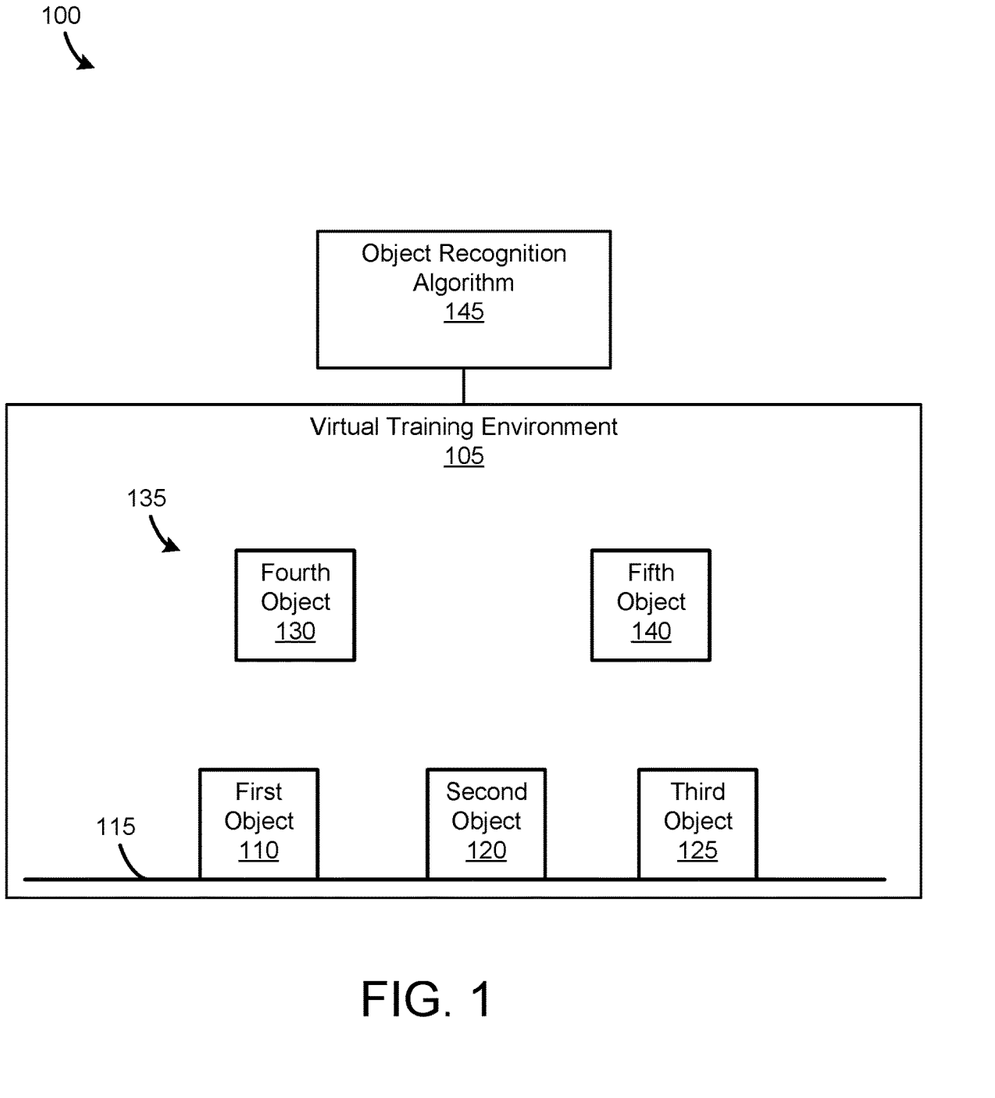
FIG. 1 is a schematic diagram of an object recognition system in which objects may be recognized using an object recognition algorithm according to one or more examples of the present disclosure.

Referring to FIG. 1, and according to one embodiment, an object recognition system 100 in which objects may be recognized by an object recognition algorithm is illustrated. In the illustrated environment, a virtual training environment 105 may include multiple objects used to train the object recognition system 100. For example, the virtual training environment 105 may include a first object 110 on a ground surface 115, a second object 120 on the ground surface 115, a third object 125 on the ground surface 115, a fourth object 130 in the air 135, and a fifth object 140 in the air 135. As may be appreciated, any number of objects may be on the ground surface 115 and/or in the air 135. The objects 110, 120, 125, 130, and/or 140 may be any type of object, such as a car, a boat, a house, a tree, an aircraft, an airplane, a helicopter, a jet, a drone, a rocket, a satellite, a missile, and so forth. The object recognition system 100 includes an object recognition algorithm 145 that is used to identify one or more of the objects 110, 120, 125, 130, and/or 140. In some embodiments, the objects 110, 120, 125, 130, and/or 140 may be related to a particular environment. In such embodiments, each of the objects 110, 120, 125, 130, and/or 140 may be considered "in context" with the particular environment (e.g., in an environment in which they are typically found). Moreover, if additional objects are added to the virtual training environment 105, the additional objects may be added because they are also in context with the environment.

In certain embodiments, at least one of the objects 110, 120, 125, 130, and/or 140 is produced synthetically (e.g., not from a photograph, from a model, from a specification, from a description, from properties corresponding to the object, etc.). In some embodiments, at least one of the objects 110, 120, 125, 130, and/or 140 includes a three-dimensional representation and properties associated with the three-dimensional representation. In various embodiments, the properties may include, spectral information, spatial information, an environment corresponding to the object, information indicating how the object is viewed using one or more sensors, and/or information corresponding to the object.

In various embodiments, the object recognition algorithm 145 is configured to label (e.g., tag) the objects 110, 120, 125, 130, and/or 140 in response to determining what the objects 110, 120, 125, 130, and/or 140 are. In certain embodiments, the object recognition algorithm 145 is configured to identify the at least one object from multiple distances (e.g., perspective distances away from the object, such as 1 centimeter ("cm"), 1 meter ("m"), 1 kilometer ("km"), 1,000 km, etc.), multiple angles (e.g., angle at which the object is viewed, such as 25 degrees, 50 degrees, 90 degrees, etc.), multiple obliquities, multiple eye points (e.g., side of the object that is viewed, such as front side, left side, right side top, bottom, etc.), multiple resolutions, and/or using multiple sensors. In various embodiments, the multiple sensors may include a panchromatic sensor, a multi-spectral sensor, and/or a hyperspectral sensor.

Figure 2:
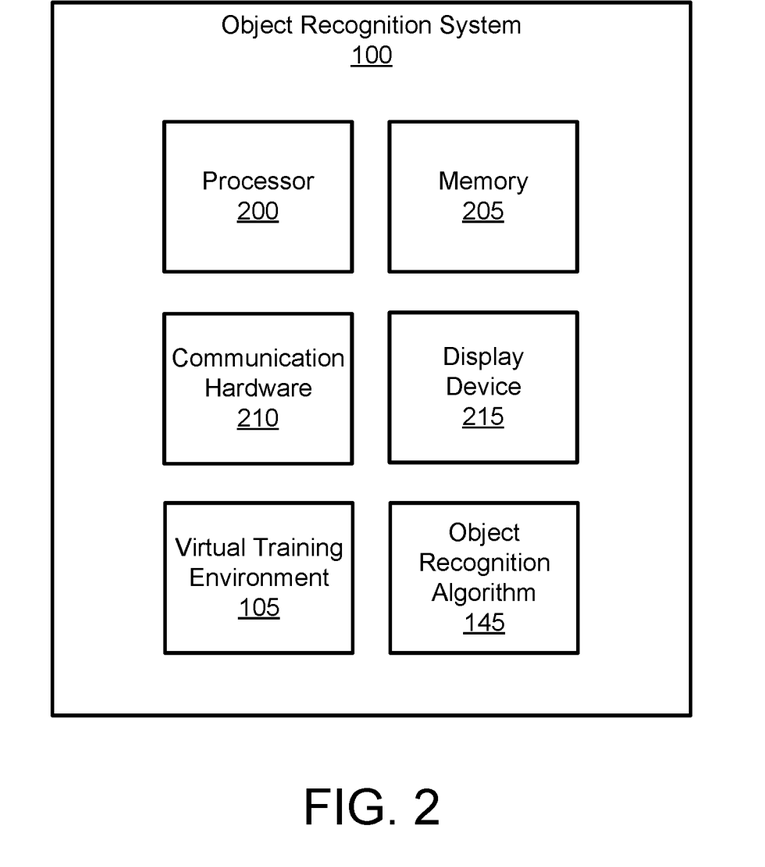
FIG. 2 is a schematic block diagram of an object recognition system according to one or more examples of the present disclosure.

FIG. 2 is a schematic block diagram of an embodiment of the object recognition system 100. The object recognition system 100 includes a processor 200, memory 205, communication hardware 210, a display device 215, the virtual training environment 105, and the object recognition algorithm 145. The virtual training environment 105 and/or the object recognition algorithm 145 may be substantially similar to the virtual training environment 105 and/or the object recognition algorithm 145 described in relation to FIG. 1.

The memory 205 may be a semiconductor storage device, a hard disk drive, an optical storage device, a micromechanical storage device, or combinations thereof. Furthermore, the memory 205 may store code and the processor 200 may be used to execute the code. Moreover, the communication hardware 210 may communicate with other devices. The display device 215 may be operatively coupled to the processor 200 and used to display data, such as data for the virtual training environment 105. The processor 200 may be used to process code used for the virtual training environment 105 and/or the object recognition algorithm 145.

In certain embodiments, the memory 205 may store code executable by the processor 200 to: create the virtual training environment 105; and/or identify multiple objects. In some embodiments, at least one object of the multiple objects identified is produced synthetically and the at least one object includes a three-dimensional representation and properties associated with the three-dimensional representation.

Figure 3:
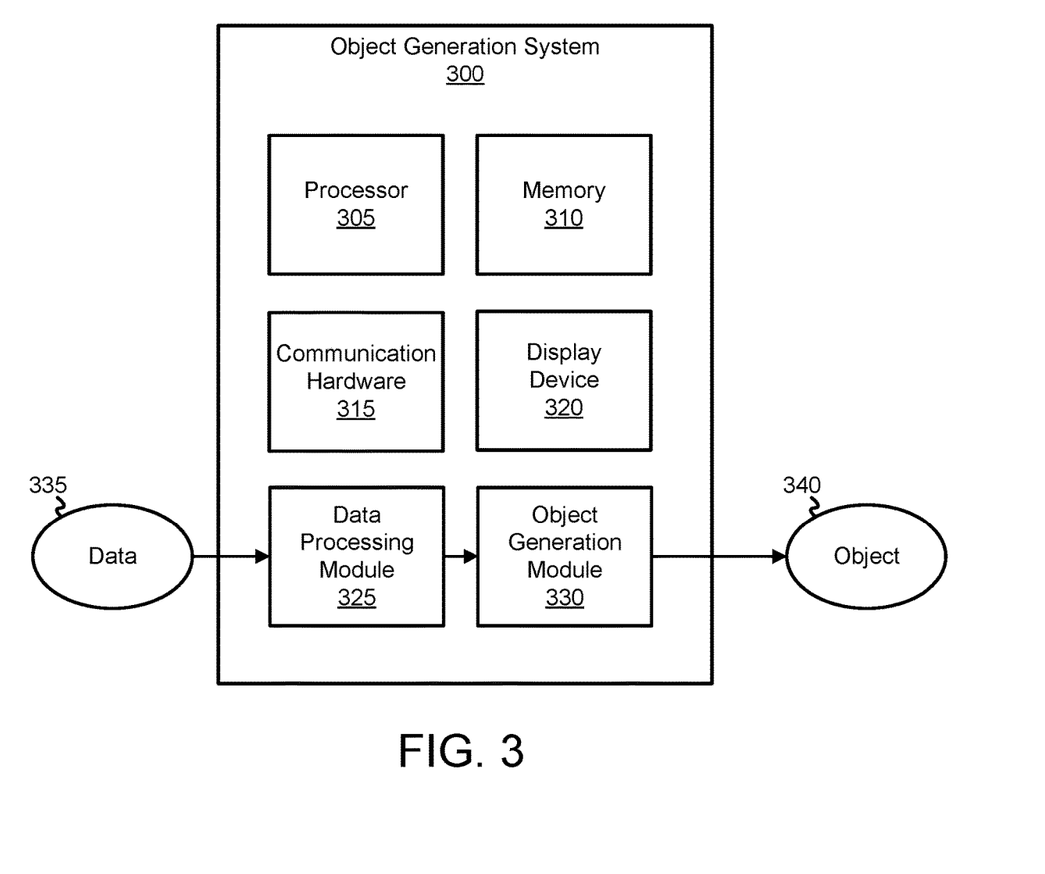
FIG. 3 is a schematic block diagram of an object generation system according to one or more examples of the present disclosure.

FIG. 3 is a schematic block diagram of an embodiment of an object generation system 300. The object generation system 300 includes a processor 305, memory 310, communication hardware 315, a display device 320, a data processing module 325, and an object generation module 330.

The memory 310 may be a semiconductor storage device, a hard disk drive, an optical storage device, a micromechanical storage device, or combinations thereof. Furthermore, the memory 310 may store code and the processor 305 may be used to execute the code. Moreover, the communication hardware 315 may communicate with other devices. The display device 320 may be operatively coupled to the processor 305 and used to display data, such as data for an object. The processor 305 may be used to process code used for the data processing module 325 and/or the object generation module 330.

The data processing module 325, in some embodiments, may receive data 335 and process the data 335. Moreover, the object generation module 330 may receive the processed data 335 from the data processing module 325 and generate an object 340 based on the processed data 335. The object 340 may include a three-dimensional representation of the object 340 and properties corresponding to the object 340.

In certain embodiments, the memory 310 may store code executable by the processor 305 to: receive a set of data corresponding to an object; generate a three-dimensional representation of the object using the set of data; generate properties for the object using the set of data; and/or associate the properties with the three-dimensional representation of the object. In some embodiments, the three-dimensional representation of the object and the properties for the object are used to produce training data for an object recognition algorithm.

Figure 4:
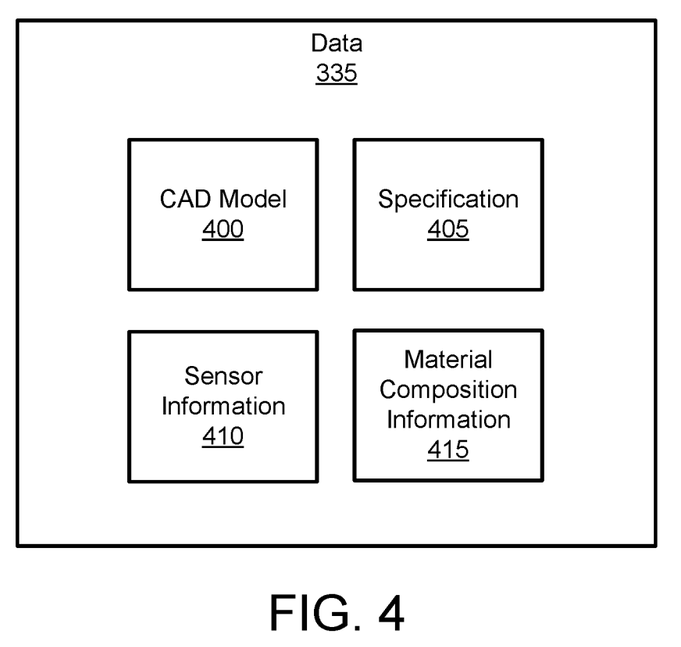
FIG. 4 is a schematic block diagram of data according to one or more examples of the present disclosure.

FIG. 4 is a schematic block diagram of one embodiment of the data 335. The data 335 may include a computer aided drawing ("CAD") model 400, a specification 405, sensor information 410, and/or material composition information 415. The CAD model 400 may be any suitable CAD model produced with any type of CAD software. The CAD model 400 may include data that enables an object corresponding to the CAD model 400 to be viewed from multiple directions, multiple angles, and/or multiple resolutions. The CAD model 400 may, in certain embodiments, include the sensor information 410 and/or the material composition information 415. The specification 405 may include details about an object that may be used to produce the object synthetically. For example, the specification 405 may include dimensions, colors, operational parameters, sensor information 410, material composition information 415, and so forth.

The sensor information 410 may include information that indicates how an object is perceived when detected by various types of sensors. For example, the sensor information 410 may include information that indicates how an object is perceived when detected by a panchromatic sensor, a multispectral sensor, and/or a hyperspectral sensor. The material composition information 415 may include information that indicates what materials an object is made of. Moreover, the material composition information 415 may also indicate whether the materials are external or internal to the object. For example, the material composition information 415 may indicate that an object is made of a metal, wood, plastic, fabric, natural materials, stone, specific minerals, and so forth.

Figure 5:
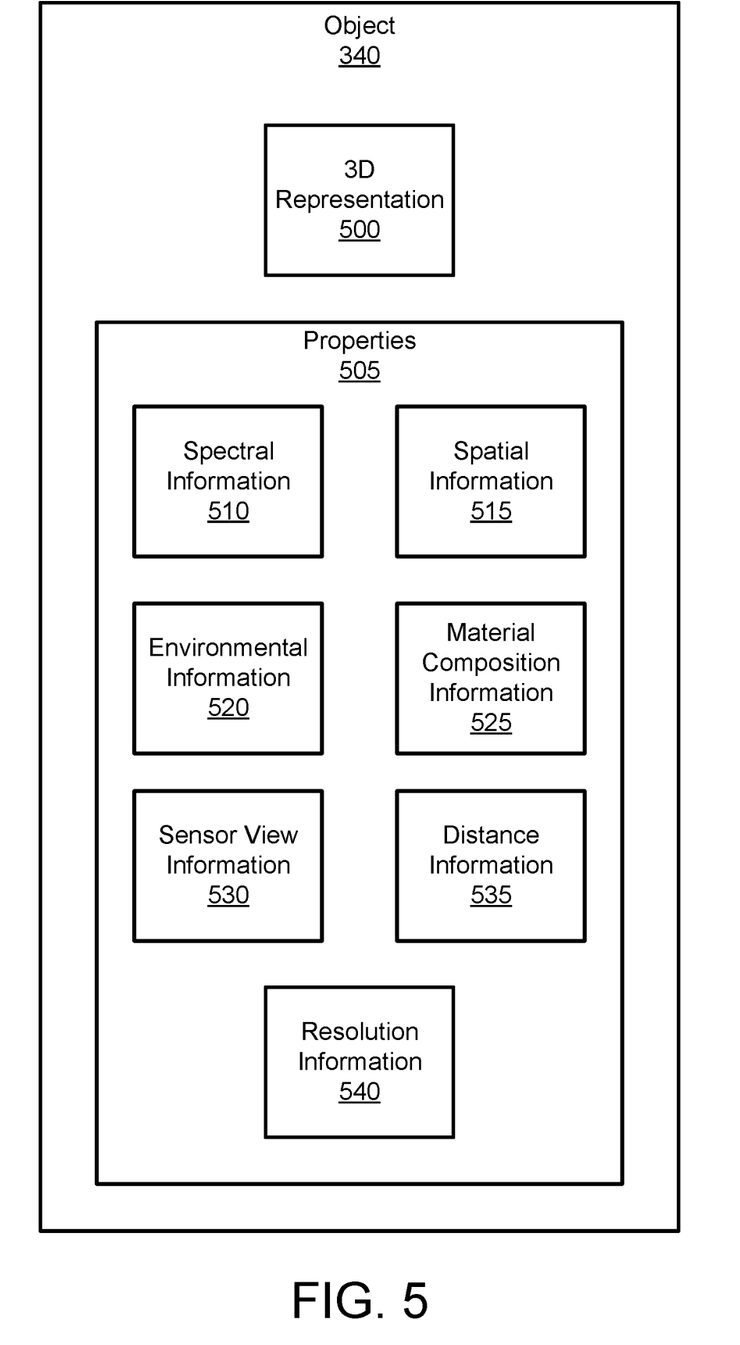
FIG. 5 is a schematic block diagram of an object according to one or more examples of the present disclosure.

FIG. 5 is a schematic block diagram of one embodiment of the object 340. The object 340 may include a three-dimensional ("3D") representation 500 and properties 505. In some embodiments, the 3D representation 500 of the object 340 may be a CAD model of the object 340. Accordingly, the 3D representation 500 may enable the object 340 to be viewed from multiple angles, multiple directions, multiple views, and/or multiple resolutions. Moreover, the properties 505 may include spectral information 510, spatial information 515, environmental information 520, material composition information 525, sensor view information 530, distance information 535, and/or resolution information 540.

Spectral information 510 may include color information, visible information from a spectrum, and/or nonvisible information from a spectrum corresponding to the object 340. In some embodiments, spatial information 515 may include a size of the object 340, arrangement of the object 340, and/or other spatial data. The environmental information 520 may include any suitable information that indicates one or more environments in which the object 340 may be found.

The material composition information 525 may include information that indicates what materials the object 340 is made of. Moreover, the material composition information 525 may also indicate whether the materials are external or internal to the object 340. For example, the material composition information 525 may indicate that the object 340 is made of a metal, wood, plastic, fabric, natural materials, stone, specific minerals, and so forth.

The sensor view information 530 may include information that indicates how the object 340 is viewed from any suitable sensor. The distance information 535 may indicate how the object 340 is viewed from any suitable distance away from (or close to) the object 340. Moreover, the resolution information 540 may indicate how the object 340 is viewed from any suitable resolution. The suitable resolutions may correspond to resolutions that a sensor may use to detect the object 340.

Figure 6:
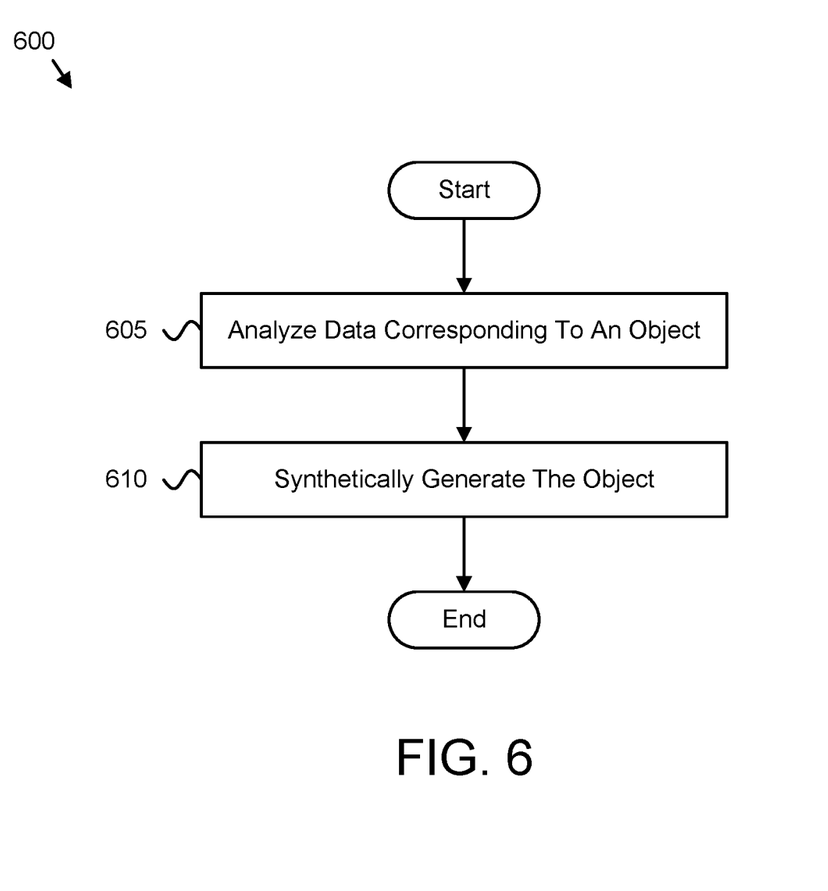
FIG. 6 is a schematic flow diagram of a method of generating an image according to one or more examples of the present disclosure.

FIG. 6 is a schematic flow diagram of one embodiment of a method 600 of generating an image. The method 600 may include analyzing 605 data (e.g., data 335) corresponding to an object (e.g., object 340). Furthermore, the method 600 may include synthetically generating 610 the object. In some embodiments, the object includes a three-dimensional representation (e.g., 3D representation 500) and properties (e.g., properties 505) associated with the three-dimensional representation.

In certain embodiments, the method 600 may include receiving the data corresponding to the object from a computer aided drawing model, a specification, sensor information, and/or material composition information. In some embodiments, the method 600 includes generating the object without a photograph of the object.

Figure 7:
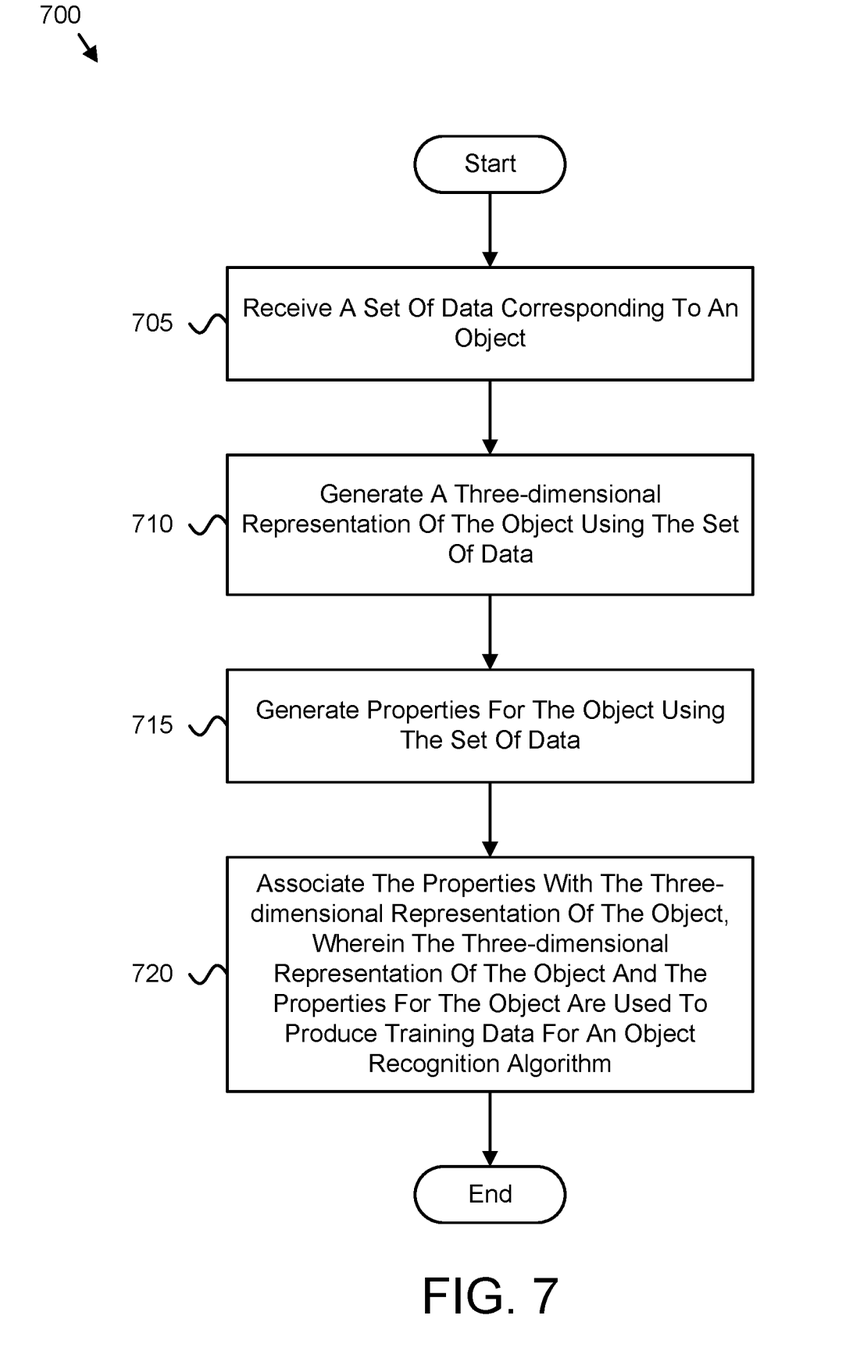
FIG. 7 is a schematic flow diagram of another method of generating an image according to one or more examples of the present disclosure.

FIG. 7 is a schematic flow diagram of another method of generating an image. The method 700 may include receiving 705 a set of data (e.g., data 335) corresponding to an object (e.g., object 340). In certain embodiments, the set of data includes a computer aided drawing model, a specification, sensor information, and/or material composition information. In various embodiments, the method 700 may also include generating 710 a three-dimensional representation (e.g., 3D representation 500) of the object using the set of data.

Furthermore, the method 700 may include generating 715 properties (e.g., properties 505) for the object using the set of data. In some embodiments, the properties include information indicating how the object is viewed using one or more sensors, material composition information corresponding to the object, information indicating how the object is viewed from multiple distances, and/or multiple resolutions. In such embodiments, the one or more sensors may include a panchromatic sensor, a multispectral sensor, and/or a hyperspectral sensor. Moreover, the method 700 may include associating 720 the properties with the three-dimensional representation of the object, wherein the three-dimensional representation of the object and the properties for the object are used to produce training data for an object recognition algorithm.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the data processing module 325 and/or the object generation module 330 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The data processing module 325 and/or the object generation module 330 may be implemented as a hardware circuit comprising custom very-large-scale integration (VLSI) circuits or gate arrays, off-the-shelf semiconductors such as logic chips, transistors, or other discrete components. The data processing module 325 and/or the object generation module 330 may also be implemented in programmable hardware devices such as field programmable gate arrays, programmable array logic, programmable logic devices or the like.

The data processing module 325 and/or the object generation module 330 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the data processing module 325 and/or the object generation module 330. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of generating an image, comprising:
receiving a set of data corresponding to an object;
generating a three-dimensional representation of the object using the set of data;
generating properties for the object using the set of data, wherein the properties comprise information indicating how the object is viewed using one or more sensors comprising a panchromatic sensor, a multispectral sensor, a hyperspectral sensor, or some combination thereof; and associating the properties comprising the information indicating how the object is viewed using the one or more sensors comprising the panchromatic sensor, the multispectral sensor, the hyperspectral sensor, or some combination thereof with the three-dimensional representation of the object, wherein the three-dimensional representation of the object and the properties for the object are used to produce training data for an object recognition algorithm.

2. The method of claim 1, wherein the set of data comprises a computer aided drawing model, a specification, sensor information, material composition information, or some combination thereof.

3. The method of claim 1, wherein the properties further comprise material composition information corresponding to the object.

4. The method of claim 1, wherein the properties further comprise information indicating how the object is viewed from a plurality of distances.

5. The method of claim 1, wherein the properties further comprise a plurality of resolutions.

6. The method of claim 1, wherein the set of data comprises a computer aided drawing model, a specification, sensor information, and material composition information.

7. The method of claim 1, wherein the properties further comprise material composition information corresponding to the object and information indicating how the object is viewed from a plurality of distances.

8. The method of claim 1, wherein the properties further comprise information indicating how the object is viewed from a plurality of distances and a plurality of resolutions.

9. The method of claim 1, wherein the properties further comprise material composition information corresponding to the object, information indicating how the object is viewed from a plurality of distances, and a plurality of resolutions.

10. An object recognition system, comprising:
a virtual training environment comprising a plurality of objects; and
an object recognition algorithm configured to identify the plurality of objects, wherein at least one object of the plurality of objects is produced synthetically, the at least one object comprises a three-dimensional representation and properties associated with the three-dimensional representation, and the properties associated with the three-dimensional representation comprise information indicating how the at least one object is viewed using one or more sensors comprising a panchromatic sensor, a multispectral sensor, a hyperspectral sensor, or some combination thereof.

11. The object recognition system of claim 10, wherein the object recognition algorithm is configured to label the plurality of objects.

12. The object recognition system of claim 10, wherein the object recognition algorithm is configured to identify the at least one object from a plurality of distances, a plurality of angles, a plurality of obliquities, a plurality of eye points, or some combination thereof.

13. The object recognition system of claim 10, wherein the object recognition algorithm is configured to identify the at least one object using a plurality of resolutions.

14. The object recognition system of claim 10, wherein the properties associated with the three-dimensional representation further comprise information indicating how the object is viewed using one or more sensors.

15. The object recognition system of claim 10, wherein the properties associated with the three-dimensional representation further comprise material composition information corresponding to the object.

16. An apparatus, comprising:
a data processing module that analyzes data corresponding to an object; and
an object generation module that synthetically generates the object, wherein the object comprises a three-dimensional representation and properties associated with the three-dimensional representation, and the properties associated with the three-dimensional representation comprise information indicating how the object is viewed using one or more sensors comprising a panchromatic sensor, a multispectral sensor, a hyperspectral sensor, or some combination thereof;
wherein at least one of the data processing module and the object generation module comprises one or more of hardware and executable code, the executable code stored on one or more non-transitory computer readable storage media.

17. The apparatus of claim 16, wherein the data processing module receives the data corresponding to the object from a computer aided drawing model, a specification, sensor information, material composition information, or some combination thereof.

18. The apparatus of claim 16, wherein the object generation module synthetically generates the object without a photograph of the object.

19. The apparatus of claim 16, wherein the properties associated with the three-dimensional representation further comprise spectral information, spatial information, or a combination thereof.

20. The apparatus of claim 16, wherein the properties associated with the three-dimensional representation further comprise an environment corresponding to the object.

* * * * *